June 19, 1951 L. L. CROSS 2,557,908
AUTOMOTIVE VENTILATOR FOR TRACTOR CABS
Filed April 24, 1947 2 Sheets-Sheet 2
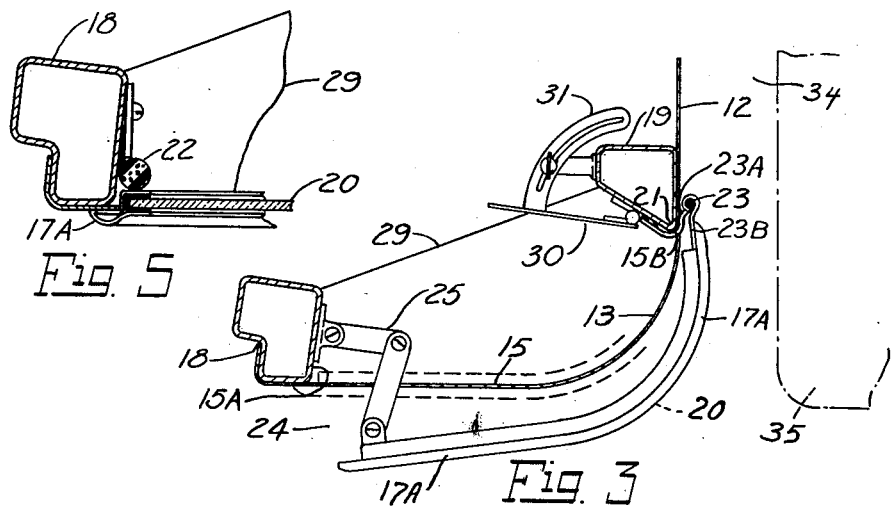
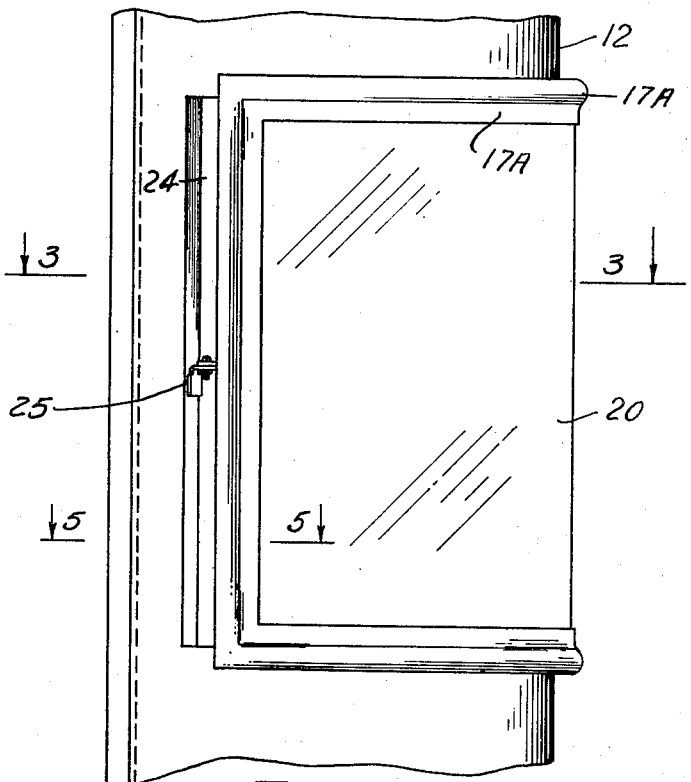
Inventor
Lester L. Cross
By Louis Illmer
Attorney Patented June 19, 1951

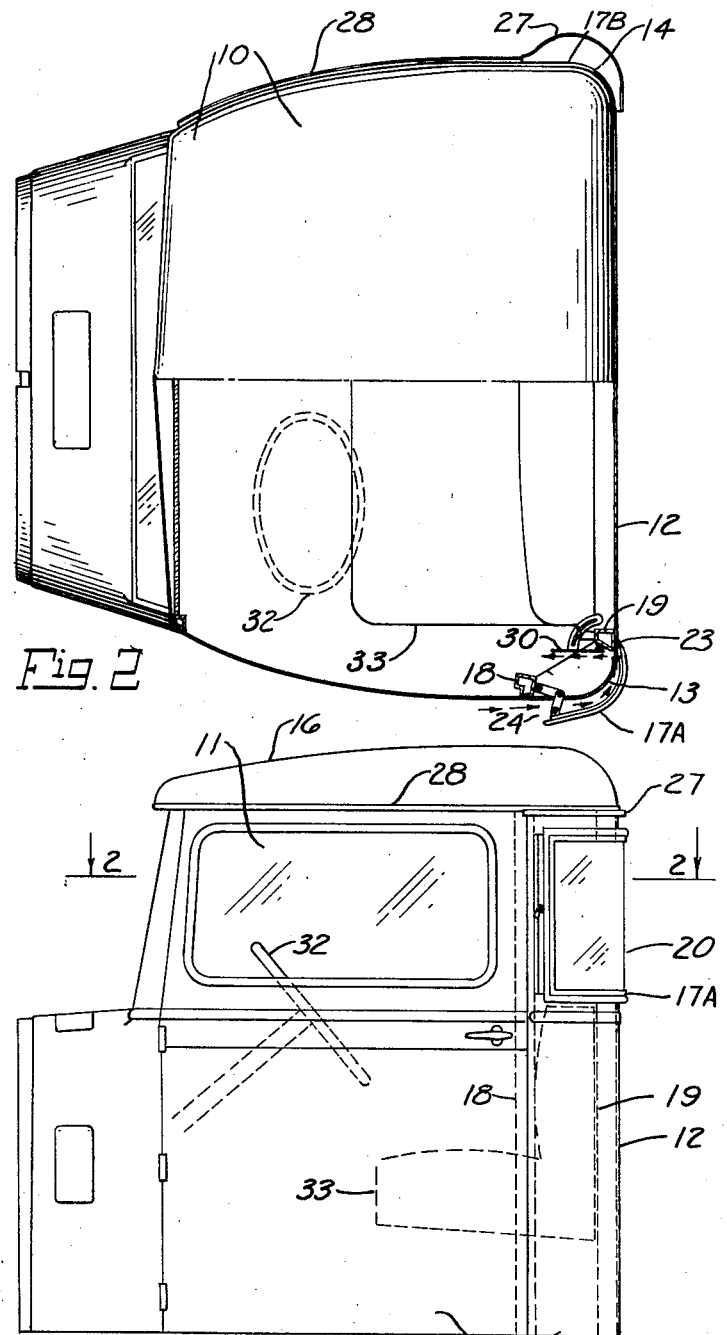

2,557,908

UNITED STATES PATENT OFFICE 2,557,908

AUTOMOTIVE VENTILATOR FOR TRACTOR CABS

Lester L. Cross, Cortland, N. Y., assignor to The Brockway Motor Company, Inc., Cortland, N. Y., a corporation of New York Application April 24, 1947, Serial No. 743,666

7 Claims. (Cl. 98—2)

This invention relates to ventilation means, and is more specially concerned with novel devices for injecting a fresh air blast into an impelled closed passenger body in an improved manner, the present rain-proof ventilator being particularly applicable for a closable driver's cab of the commercial transport, trailer van or dump body type mounted upon a common or separate chassis, either of which is inherently deficient in affording adequate rear view road vision for the driver.

My ventilator is preferably interposed between such tandem bodies and fashioned as a regulatable rear corner window that is tiltably mounted on a vertical axis and its transparent pane may be given a sharply concaved horizontal profile closely conforming to that of the outer cab sheath to which my ventilator framework is attached. Such corrective obviates blind spots in each rear corner region of a tractor truck cab and enables the driver to better heed fast passing traffic, a provision that represents a vital feature of the applicant's improvements.

When partially opened, the mouth of said corner ventilator is purposely headed forwardly into the air stream set up about a rapidly moving vehicle body. In rainy weather, the resulting air flow that is swept along the interior face of my curved pane or the like panel serves as a centrifugal separator designed to trap and automatically eject its drain exteriorly of the body confines. In addition, an adjustable baffle may be provided to redirect the delivered air blast in a selective manner without subjecting the driver to obnoxious draught.

The object of my improvements is to devise a ventilator of the indicated character adapted to rearwardly visualize oncoming traffic and to controllably distribute a fresh quota of rain-proof air into the body interior as delivered in the direction of vehicle travel.

Reference is had to the accompanying two sheets of drawings showing an illustrative exemplification as applied to an automotive cab, and in which:

Fig. 1 represents an elevational side view of a truck cab equipped with dual ventilators, and Fig. 2 is a top view thereof showing a corner ventilator assembly as taken in partial section along 2—2 of Fig. 1.

Fig. 3 as taken along 3—3 of Fig. 4 depicts an enlarged horizontal section of one such ventilator assembly swung into a partially open position, and Fig. 4 is an elevational face view of a transparent ventilator pane provided with an edge embracing sash.

Fig. 5 fragmentally discloses a cross-sectional detail of a preferred style of casing seal as taken along 5—5 of Fig. 4.

Referring more specifically to such structure, my ventilator may be inbuilt into a conventional truck cab 10 provided with a side door 11 and a body sheath comprising a rear wall or transverse back sheath component 12 having sharply rounded corner elements 13 and 14 appended thereto. Beneath the deck sheath 16, each such vertical rear corner region may be rectangularly perforated at 15 as a warped casement having opposed outer and inner marginal edges 15A and 15B that respectively mount a right-hand or left-hand window sash 17A or 17B therebetween, said sash assembly being preferably located immediately behind the upper back edge of the driver's seat as shown.

Such matched arcuate sash may be assembled from shaped tubular metal stock of a kind that will closely fit the corresponding contour given to the opening 15. A cushioned convex transparent pane 20 may be seated into each such sash which is herein wholly mounted exteriorly of the body sheathing.

As will be understood, the rear wall 12 of my improved tractor cab is generally kept interspaced from its trailing van body to leave sufficient room for the operative installation of my cab ventilator that is herein compactly combined with a swingable transparent rear view pane. Present day transport vans are likely to be deficient in providing adequate rear view vision; my adjustable ventilator additionally serves to keep the cab interior supplied with fresh air under inclement weather conditions to lessen driver fatigue. By injecting such air directly into the scoop mouth 24 as herein practiced, its action without having to protrude excessively beyond the cab side confines, is made directly responsive to a comparatively slow cab travel rate. As indicated by dotted outline in Fig. 1, said cab sheathing 12 may be affixed about a skeletonized framework that includes a door jamb 18 and a laterally spaced quarter post 19 for each upright body corner region. The components of such sheath reenforcing frame may be fabricated as a wooden structure but may likewise utilize tubular metal posts. As shown, each quarter post 19 may in part be given a right trapezium profile shape to include a sloping face of which the rectilinear toe 21 adjoins the rear sheath component 12 in marginal registry with the inner vertical edge 15B of its sheath aperture 15.

The rearward edge of the window sash 17A or 17B may be hinged by the vertical pintle means 23 located near said toe region 21 (see Fig. 3) and positioned in the interspace 34 generally provided between the tractor cab 10 and the trailer body 35 as schematically indicated in dotted and dashed outline. Such disposition allows the forwardly directed sash edge to swing outwardly and away from its adjacent jamb post as a closable air scoop or ventilator mouth 24. My vertical sash pintle 23 may be fixedly carried by and contiguous to the inner marginal sheath edge 15B of the rear body opening 15. The associated hinge assembly may be fashioned in any appropriate manner and may comprise knuckle jointed complementary leaves such as 23A and 23B (see Fig. 3). A suitable toggle linkage 25 may serve to set said outboard scoop into a preferred operative position with regard to the advancing vehicle movement. When closed, the sash may be sealed in the Fig. 5 manner against an anchored soft gasket of the tongue type such as 22.

It will be observed that the horizontal cross-section of my pane 20 is purposely given a cylindrically distorted profile so that the scooped incoming air blast will sweep along the inner concave pane face and be subjected to substantial centrifugal action. In the event of rainy weather, any globules of moisture contained in such drenched air current will automatically be deposited upon said face as concentrate and thence by gravity descend downwardly in trapped self-draining fashion for delivery through the lower edge gap of a partially opened ventilator without being carried into the body interior. The encased pane 20 is preferably made from sheet plastic to afford a non-shatterable transparent medium. As will be obvious, the same trapping action may also be realized by the use of a non-transparent scoop but which opaque blade would obstruct rear view vision.

In order that rain shall not lodge in the upper edge gap of my operatively opened sash, it is preferred to provide for an overlapping protective ledge trough 27 which may be arranged directly beneath a conventional deck drip moulding 28. The casement sill 29 of my sheath opening 15 may bridge the posts 18 and 19 and be given a bevel that outwardly drains any condensed moisture splash. The concave profile of my pane or blade 20 is preferably made sufficiently sharp in curvature radius to insure that substantially all entrained rain will by centrifugal action be removed from the incoming air stream prior to reaching the ventilator pintle region.

Coincident with or adjacent to such pintle 23, there may further be hinged a baffle plate or auxiliary air current deflector 30 provided with an adjustable quadrant 31 serving to retain the pivoted baffle in a fixed position. When shifted forwardly as shown, an induced fresh air blast may be given a complete U-turn. Such fully reversed air flow may be diffused alongside the inner body side wall at one back end of the single transverse seat 33 without need of any body defacing supply conduits as indicated by arrows in Fig. 2 and thus prevent throwing a direct draught upon the driver while reposing behind a steering wheel 32 upon the cab seat 33. When touring in a hot sultry climate, said baffle of the ventilator 17A may be shifted to deliberately direct a cooling air stream toward the driver. The other mated ventilator 17B may also be selectively adjusted to suit the preference of a seated passenger. Should such baffle adjustment prove superfluous, the cross-section of the quarter post 19 itself may be suitably shaped to function as a fixed baffle agency against which to impinge or otherwise redirect the incoming air flow. It is not essential that my ventilator panel 20 be hingedly mounted since as a non-adjustable type, it may be fixedly inclined with respect to the post 19.

The same underlying ventilator principles may be individually applied to a row of bus seats or the like. Although the foregoing structural disclosure has been primarily directed to a cab installation, it is believed the operative advantages inherent in my ventilator means will have been made sufficiently evident to those skilled in this art and I reserve the right to equivalently modify my illustrative embodiments, all without departing from the spirit and scope of my invention as characterized by the appended claims.

I claim:

1. An adjustable ventilator incorporated into a forwardly impelled tractor cab comprising opposed side walls and a transverse rear wall disposed adjacent to the back of a driver's seat and which cab is tandem connected to a trailer body to leave an interspace therebetween, said cab providing for a vertical rear corner region defined by an exterior sheath portion of rounded contour having an opening therethrough bounded by a vertical inner and an opposed outer marginal edge respectively disposed in said rear wall and in one side wall, vertical pintle means upheld alongside said inner edge region and located in the aforesaid interspace, and a concaved panel substantially conforming with said sheath contour and of which curved panel one profile end extends into said interspace for hinged engagement with said pintle means and the swinging end of which panel projects from the pintle axis beyond the outer marginal edge, said panel when partially opened serving as a scoop that induces an air blast to flow from behind the driver's seat into the interior of the forwardly impelled tractor cab.

2. An adjustable ventilator incorporated into a tractor cab comprising opposed side walls and a transverse rear wall and which cab is tandem connected to a trailer body to leave an interspace therebetween, said cab providing for a vertical rear corner region exteriorly defined by a sheath portion of sharply rounded cross-sectional profile having an opening therethrough bounded by a vertical inner and an opposed outer marginal edge respectively disposed in said rear wall and in one side wall, a concaved transparent pane matched to adjustably close said opening, vertical pintle means upheld by said inner edge region in alongside relation, and an endless sash circumscribing said pane and of which sash one end extends into said interspace for hinged engagement with the pintle means and the swinging end of which sash projects outwardly beyond the hinge axis to exteriorly overlie the other marginal edge of said opening, said pane serving as a combined ventilator and a rear view agency for said cab.

3. An adjustable ventilator incorporated into a tractor cab comprising opposed side walls and a transverse rear wall disposed adjacent to the back of a driver's seat and which cab is tandem connected to a trailer body to leave an interspace therebetween, said cab providing for a vertical rear corner region defined by an exterior sheath portion of rounded contour having an opening therethrough bounded by an inner and an opposed outer marginal edge respectively disposed in said rear wall and in one side wall, vertical pintle means upheld by said inner edge in contiguous alongside relation, and a transparent pane together with a pane embracing sash are swingably carried by said vertical pintle means and which pane and sash are shaped to close said opening without materially obstructing visibility therethrough, said pane and sash overlappingly extending exteriorly beyond the outer marginal edge and when partially open serving as a scoop that induces air flow along the interior pane face when the tractor cab is propelled forwardly.

4. An adjustable ventilator incorporated into a tractor cab comprising opposed side walls and a transverse rear wall and which cab is tandem connected to a trailer body to leave an interspace therebetween, said cab providing for a vertical rear corner region exteriorly defined by a sheath portion of sharply rounded cross-sectional profile having a rectangular opening therethrough bounded by an inner and an opposed outer marginal edge respectively disposed in said rear wall and in one side wall, vertical pintle means upheld in the vicinity of the aforesaid interspace alongside said inner edge region, and a sharply concaved panel having a curved end portion hinged to the pintle means and its swingable end disposed as an exterior closure agency for said opening, the swingable end portion of said panel when partially opened leaving a drip gap beneath the lower panel edge and arranged to project outwardly beyond its adjacent body side to constitute an air scoop adapted to induce rain drenched air to flow along the concave face of said panel and subject such flow to centrifugal action as a rain separator when the tractor cab is propelled forwardly, such separated rain being automatically drained exteriorly of the cab confines through said gap.

5. An adjustable ventilator incorporated into a tractor cab comprising opposed side walls and a transverse rear wall and which cab is tandem connected to a trailer body to leave an interspace therebetween, said cab providing for a vertical rear corner region exteriorly defined by a sheath portion of sharply rounded cross-sectional profile having a rectangular opening therethrough bounded by an inner and an opposed outer marginal edge respectively disposed in said rear wall and in one side wall, vertical pintle means upheld in the vicinity of the aforesaid interspace alongside said inner edge region, and a sharply concaved panel having a curved end portion hinged to the pintle means and its swingable end disposed as an exterior closure agency for said opening, the swingable end portion of said panel being arranged to project outwardly beyond its adjacent cab side wall to constitute an air scoop which when partially opened provides for a gap extending along the upper panel edge, and protective ledge means overhanging said gap.

6. An adjustable ventilator incorporated into a tractor cab comprising opposed side walls and a transverse rear wall disposed adjacent to the back of a driver's seat and which cab is tandem connected to a trailer body to leave an interspace therebetween, said cab providing for a vertical rear corner region defined by an exterior sheath portion of rounded contour having an opening therethrough bounded by an inner and an opposed outer marginal edge respectively disposed in said rear wall and in one side wall, vertical pintle means upheld by said inner edge in alongside relation, and a transparent concaved panel substantially conforming with the contour shape of said sheath and of which panel one profile end extends into said interspace for operative engagement with said pintle means and the swinging panel end projects from the pintle axis beyond the outer marginal edge to constitute a scoop adapted to induce air flow along the concave panel face when the cab is propelled forwardly, and interiorly located baffle means disposed to redirect a component of such flow in the direction of cab travel and toward the driver's seat.

7. An adjustable ventilator incorporated into a tractor cab comprising opposed side walls and a transverse rear wall and which cab is tandem connected to a trailer body to leave an interspace therebetween, said cab providing for a vertical rear corner region exteriorly defined by a sheath portion of sharply rounded cross-sectional profile having a rectangular opening therethrough bounded by an inner and an opposed outer marginal edge respectively disposed in said rear wall and in one side wall, a body post interiorly erected alongside such inner edge region, exteriorly disposed vertical pintle means upheld by said post in the vicinity of the aforesaid interspace, a concaved panel conforming with the sheath profile and mounted to swing on the pintle means in a converging relation toward said post and the divergent region of which panel overlappingly extends beyond the outer marginal edge as a scoop adapted to induce air flow along the inner panel face toward said post when the cab is impelled forwardly and which post upon being impinged serves to divert such induced air flow along a forwardly directed course in substantial alignment with the cab travel.

LESTER L. CROSS.

REFERENCES CITED

The following references are of record in the file of this patent:

UNITED STATES PATENTS

| Number | Name | Date |
|---|---|---|
| 1,816,314 | Canney | July 28, 1931 |
| 1,981,897 | Bishop | Nov. 27, 1934 |
| 2,023,699 | Robinson | Dec. 10, 1935 |

FOREIGN PATENTS

| Number | Country | Date |
|---|---|---|
| 759,208 | France | Nov. 16, 1933 |
| 774,173 | France | Sept. 17, 1934 |
| 780,719 | France | Feb. 4, 1935 |
| 478,428 | Germany | June 24, 1929 |
| 523,721 | Great Britain | July 22, 1940 |